No. 787,870. PATENTED APR. 18, 1905.
M. G. ADEN.
COUPLING.
APPLICATION FILED JULY 11, 1904.
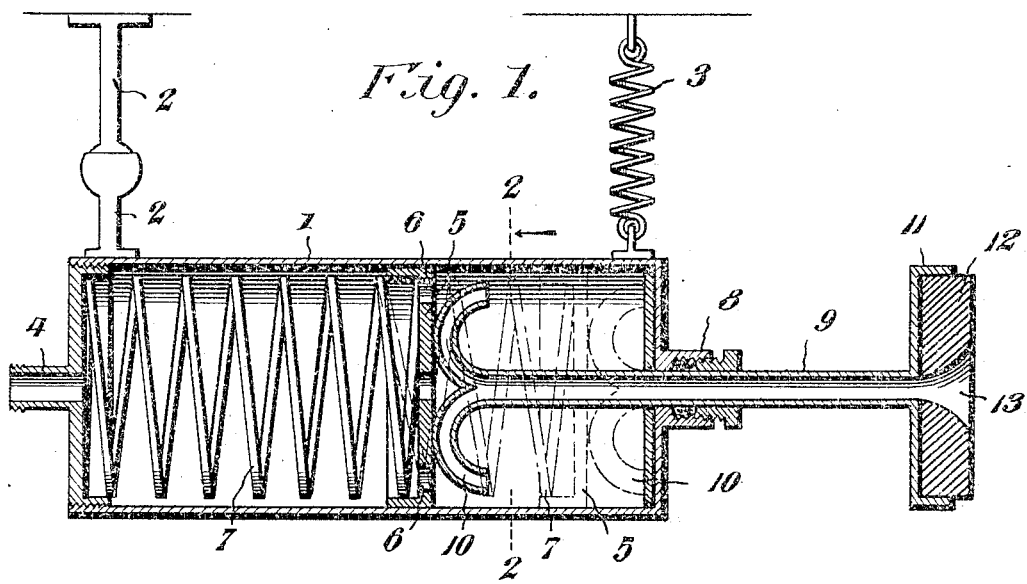
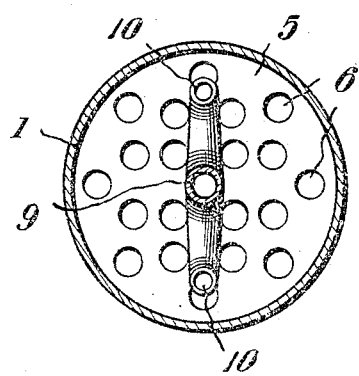
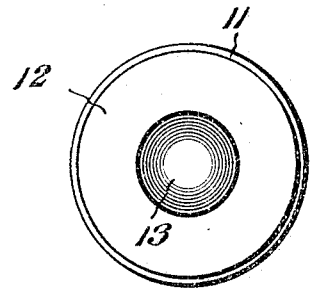
Inventor
Menhard G. Aden.
Witnesses
By Herbert D. Lawson
Attorney No. 787,870.

Patented April 18, 1905.

UNITED STATES PATENT OFFICE.

MENHARD G. ADEN, OF GOTHENBURG, NEBRASKA.

COUPLING.

SPECIFICATION forming part of Letters Patent No. 787,870, dated April 18, 1905.

Application filed July 11, 1904. Serial No. 216,050.

*To all whom it may concern:*

Be it known that I, MENHARD G. ADEN, a citizen of the United States, residing at Gothenburg, in the county of Dawson and State of Nebraska, have invented new and useful Improvements in Couplings, of which the following is a specification.

My invention relates to new and useful improvements in couplings for air-brakes; and its object is to provide devices of this character which are adapted to be readily connected to the ends of cars and which do not require securing devices for holding together the couplings of two cars.

A further object is to provide means whereby the couplings of cars will be automatically connected so as to cause an unobstructed passage to be immediately opened through the two couplings.

A further object is to provide means whereby the passage of air through the coupling is automatically cut off when two adjoining couplings are separated.

With the above and other objects in view the invention consists of a casing having a spring-pressed plunger which contacts with a tubular stem having outlets which are held normally in contact with one end of the casing by the plunger. The stem has a head provided with an enlarged opening therein, and when the heads of two couplings such as herein described are brought together the open inner ends of the stems are pressed away from the ends of the casing, so as to form an unobstructed passage through the two couplings. As soon as pressure is removed from the stems the spring-pressed plungers will return said stems to their normal positions with the open inner ends thereof closed.

The invention also consists of the further novel construction and combination of parts hereinafter more fully described, and pointed out in the claims.

In the accompanying drawings I have shown the preferred form of my invention.

In said drawings, Figure 1 is a vertical longitudinal section through one of the couplings, showing the positions assumed by the stem and follower when two couplings are together and also showing in dotted lines the normal positions of the inner end of the stem and follower. Fig. 2 is a section on line 2 2, Fig. 1; and Fig. 3 is an end elevation of the head.

Referring to the figures by numerals of reference, 1 is a casing supported at one end of a car-body, preferably by means of hangers 2, connected by a universal joint, although any other form of connection may be provided, if desired. A spring 3 is preferably employed for supporting the forward end of the casing 1. A tubular extension 4 is arranged at the rear end of the casing for connection with the pipes of the air-brake system, and slidably mounted within the casing is a follower 5, having apertures 6 therein, and interposed between this follower and the rear end of the casing is a coiled spring 7. A gland 8 is arranged at the forward end of the casing, and slidably mounted therein is a tubular stem 9. This stem has oppositely-curved outlets 10 at its inner end, which are adapted to contact with the forward end of the casing and to be normally closed thereby, said outlets being held against the casing by the spring-pressed follower, as shown in dotted lines in Fig. 1. A cup-shaped head 11 is located at the outer end of stem 9, and seated therein is a block 12, of rubber or other resilient material, having an enlarged aperture 13 therein, which communicates with the interior of the stem 9.

It will be understood that the passage of air from the extension 4 to the stem 9 is normally prevented in view of the fact that the outlets 10 are normally pressed tightly against the forward end of casing 1 by the spring 7, thereby entirely closing said outlets. When two cars are brought together, both having couplings such as herein described, the heads of the two couplings will come in contact with each other and the two stems 9 of the two couplings will be pressed inward and the blocks 12 held in contact with each other by the tension exerted by the spring 7. As soon as the stems 9 are pressed inwardly the passage through the stems is opened and air is therefore free to circulate through both stems, through the casings 1, and through the tubular extensions 4. By mounting the casings in the manner shown the same are permitted to move in different directions to allow for any unevenness in the track over which the cars are traveling. It will be understood that as soon as two cars are uncoupled and removed from each other the springs 7 will press the followers 5 and stems 9 longitudinally of the casing and close the outlets 10.

In the foregoing description I have shown the preferred form of my invention; but I do not limit myself thereto, as I am aware that modifications may be made therein without departing from the spirit or sacrificing any of the advantages thereof, and I therefore reserve the right to make such changes as fairly fall within the scope of my invention.

Having thus described the invention, what is claimed as new is—

1. In a device of the character described, the combination with a casing having an opening therein; of a tubular stem slidably mounted within and extending from the casing, oppositely-extending curved outlets at the inner end of the stem, and a spring-pressed follower for holding the outlets normally in contact with and closed by one end of the casing.

2. In a device of the character described, the combination with a casing having an outlet; of a tubular stem slidably mounted within and extending from the casing, a head at the outer end of the stem, oppositely-extending curved outlets at the inner end of the stem, and a spring-pressed follower within the casing for holding the outlets normally in contact with and closed by one end of the casing.

3. In a device of the character described, the combination with a casing having an outlet; of a tubular stem slidably mounted within and projecting from the casing, a head at the outer end of the stem, a resilient block therein having an enlarged aperture therethrough, oppositely-extending curved outlets at the inner end of the stem, and a spring-pressed follower contacting with the stem and adapted to hold the outlets normally in contact with and closed by one end of the casing.

In testimony whereof I affix my signature in presence of two witnesses.

MENHARD G. ADEN.

Witnesses:
   CHAS. A. MORELL,
   JURGEN ADEN.